(12) United States Patent
Yoneda

(10) Patent No.: US 7,479,817 B2
(45) Date of Patent: Jan. 20, 2009

(54) SEMICONDUCTOR DEVICE

(75) Inventor: Takashi Yoneda, Osaka (JP)

(73) Assignee: Panasonic Corporation, Osaka (JP)

( * ) Notice: Subject to any disclaimer, the term of this patent is extended or adjusted under 35 U.S.C. 154(b) by 33 days.

(21) Appl. No.: 11/606,979

(22) Filed: Dec. 1, 2006

(65) Prior Publication Data

US 2007/0127178 A1    Jun. 7, 2007

(30) Foreign Application Priority Data

Dec. 1, 2005    (JP)    ............................. 2005-347560

(51) Int. Cl.
    *H03K 3/02*    (2006.01)

(52) U.S. Cl. ......................... 327/198; 327/142; 327/143

(58) Field of Classification Search ................. 327/142, 327/143, 198
See application file for complete search history.

(56) References Cited

U.S. PATENT DOCUMENTS 6,169,944 B1    1/2001  Hayasaka
6,624,673 B2 *  9/2003  Kim ........................... 327/143

FOREIGN PATENT DOCUMENTS

JP    7-36574    2/1995

\* cited by examiner

*Primary Examiner*—Kenneth B Wells
*Assistant Examiner*—Juan C Martinez
(74) *Attorney, Agent, or Firm*—McDermott Will & Emery LLP (57) ABSTRACT

A memory voltage monitoring circuit generates a low voltage detection signal when a power supply voltage drops below a memory contents holding voltage. A reset circuit generates a reset signal from an external reset signal and outputs the reset signal to the memory voltage monitoring circuit as an operation permission/no-permission signal. The memory voltage monitoring circuit operates while the reset signal shows operation permission.

8 Claims, 7 Drawing Sheets

SEMICONDUCTOR DEVICE

BACKGROUND OF THE INVENTION

1. Field of the Invention

The present invention relates to a semiconductor device provided with a memory voltage monitoring circuit monitoring whether a power supply voltage is below a memory contents holding voltage or not.

2. Description of the Related Art

According to a semiconductor device such as an LSI, a range of the assurance voltage of a memory circuit in a state having no access is generally larger than a circuit in which an operation is continuously repeated by an internal clock. Thus, some LSI provides a memory contents holding voltage range separately from the operation voltage range. Moreover, there is proposed an LSI comprising a memory voltage monitoring circuit for monitoring a power supply voltage so as not to depart from the memory contents holding voltage range in the purpose of improving the reliability of the data of the memory circuit.

Figure 7:
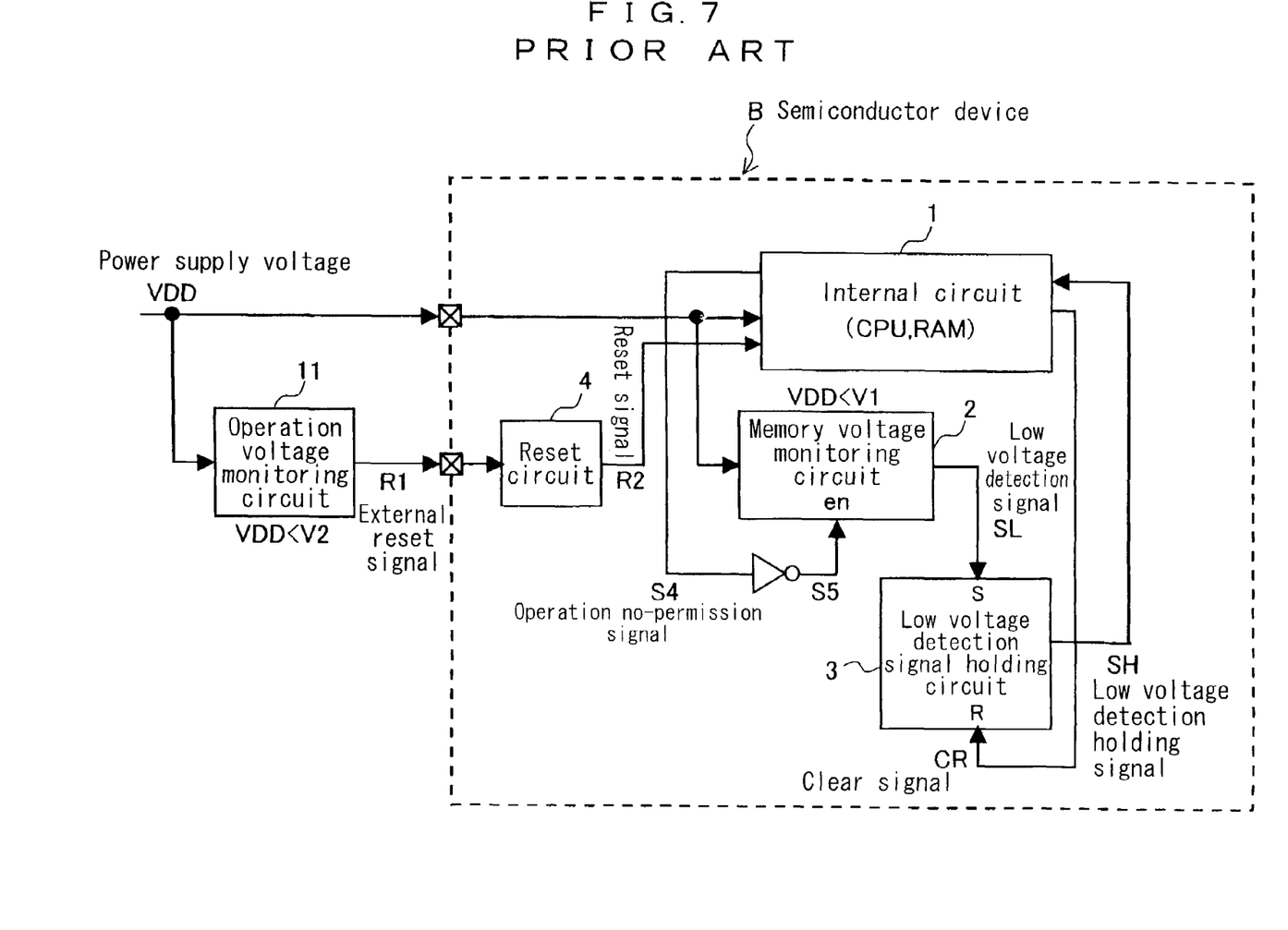
FIG. 7 is a block diagram showing the constitution of a semiconductor device according to a conventional technique.

Hereinafter, a description will be made of a semiconductor device comprising a conventional memory voltage monitoring circuit disclosed in Japanese Unexamined Patent Publication No. 7-36574 with reference to FIG. 7. Referring to FIG. 7, reference character B designates a semiconductor device, reference numeral 1 designates an internal circuit existing in the semiconductor device B such as a CPU (Central Processing Unit) or a RAM (Random Access Memory), reference numeral 2 designates a memory voltage monitoring circuit that monitors a power supply voltage VDD supplied to the semiconductor device B and outputs a low voltage detection signal SL when the power supply voltage VDD drops below a memory contents holding voltage V1, reference numeral 3 designates a low voltage detection signal holding circuit that temporally holds the low voltage detection signal from the memory voltage monitoring circuit 2 and outputs it to the internal circuit 1 as a low voltage detection holding signal SH, reference numeral 4 designates a reset circuit that receives an external reset signal R1 and generates and outputs a reset signal R2, and reference numeral 11 designates an operation voltage monitoring circuit such as a reset IC that is provided outside the semiconductor device B and monitors the power supply voltage VDD and outputs an external reset signal R1 when the power supply voltage VDD drops below an operation voltage V2 (V2>V1).

The memory voltage monitoring circuit 2 starts the operation in response to an inversion signal S5 of an operation no-permission signal S4 outputted from the internal circuit 1. The low voltage detection signal holding circuit 3 is cleared by a clear signal CR from the internal circuit 1.

According to the above conventional technique, since the memory voltage monitoring circuit 2 is constantly in an operating state after a power supply is turned on, the power consumption of the memory voltage monitoring circuit 2 is increased. In view of reducing the power consumption, the power consumed by the memory voltage monitoring circuit cannot be ignored and therefore, the memory voltage monitoring circuit is not mounted in a semiconductor device that features reduction in power consumption in many cases.

Moreover, even in a semiconductor device provided with the memory voltage monitoring circuit, it needs control by the memory voltage monitoring circuit when the operation mode is transmitted to a low power consumption mode, which requires a complicated programming process. Meanwhile, when the memory voltage monitoring circuit stops the monitoring operation, the voltage detection itself cannot be implemented at the time of executing the low power consumption mode.

SUMMARY OF THE INVENTION

Thus, it is an object of the present invention to provide a semiconductor device in which a low power consumption mode can be implemented with a memory voltage monitoring circuit without needing a troublesome setting by a user.

In order to attain the above object, a semiconductor device according to the present invention comprises a memory voltage monitoring circuit generating a low voltage detection signal when a power supply voltage drops below a memory contents holding voltage and a reset circuit generating a reset signal from an external reset signal and outputting the reset signal to the memory voltage monitoring circuit as an operation permission/no-permission signal, in which the memory voltage monitoring circuit operates while the reset signal shows operation permission.

In this constitution, when the power supply is turned on and the power supply voltage starts to rise, since the power supply voltage is lower than the operation voltage of the semiconductor device at first, the reset signal of the reset circuit is activated (in an operation permission state) and this functions as an operation permission signal of the memory voltage monitoring circuit and the memory voltage monitoring circuit starts to monitor the power supply voltage. Since the power supply voltage is lower than a memory contents holding voltage at first, the memory voltage monitoring circuit generates a low voltage detection signal (activating). Thus, the reset signal is kept activated (in the state of operation permission) until the power supply voltage rises above the operation voltage. Thus, the memory voltage monitoring circuit keeps the operation state. When the power supply voltage rises and exceeds the operation voltage, the internal circuit such as a CPU or a memory starts to operate. At the same time, the reset signal (operation permission/no-permission signal) is deactivated (operation no-permission state) and the memory voltage monitoring circuit stops the monitoring operation, so that the power consumption of the semiconductor device is reduced.

The operation stopped state of the memory voltage monitoring circuit is continued until the power supply voltage drops below the operation voltage. When the power supply voltage drops below the operation voltage, the reset signal of the reset circuit is activated (operation permission state) and this functions as the operation permission signal of the memory voltage monitoring circuit and the memory voltage monitoring circuit restarts to monitor the power supply voltage. When the power supply voltage becomes more than the operation voltage, the memory voltage monitoring circuit stops the monitoring operation again so that the power consumption of the semiconductor device is reduced.

In addition, by providing the low voltage detection signal holding circuit holding the low voltage detection signal, even when the monitoring operation of the memory voltage monitoring circuit is stopped while the reset signal is inputted from the outside, since the state of the low voltage detection signal detected by the memory voltage monitoring circuit before stoppage can be held by the low voltage detection signal holding circuit, the reliability of memory contents can be secured.

As described above, according to the present invention, the memory voltage monitoring circuit operates only while the reset signal is activated as the memory voltage monitoring circuit is lower than the operation voltage, and automatically stops the monitoring operation when the power supply voltage becomes more than the operation voltage. Therefore, the low power consumption mode can be implemented with the memory voltage monitoring circuit without needing troublesome setting by the user.

Furthermore, according to the present invention, the semiconductor device further comprises an OR circuit, in which the reset circuit outputs the reset signal to the OR circuit instead of outputting it to the memory voltage monitoring circuit, and the OR circuit generates an OR signal between the operation control signal set by a program and the reset signal and outputs the OR signal to the memory voltage monitoring circuit as the operation permission/no-permission signal.

According to the above constitution, the memory voltage monitoring circuit operates only while the power supply voltage is lower than the operation voltage and the reset signal is activated (operation permission state) and automatically stops the monitoring operation when the power supply voltage becomes more than the operation voltage. Thus, the low power consumption mode can be implemented with the memory voltage monitoring circuit without needing troublesome setting by the user. In addition, the memory voltage monitoring circuit can be switched to the monitoring operation state at any time with the operation control signal set by the program.

Moreover, according to the present invention, the semiconductor device further comprises a synchronous circuit cell, in which the reset circuit outputs the reset signal to the synchronous circuit cell instead of outputting it to the memory voltage monitoring circuit, and the synchronous circuit cell activates the operation control signal set by the program based on the reset signal and outputs the activated operation control signal to the memory voltage monitoring circuit as the operation permission/no-permission signal.

According to this constitution, by adjusting the operation control signal inputted to the synchronous circuit cell, the memory voltage monitoring circuit also operates only while the power supply voltage is lower than the operation voltage and the reset signal is activated (operation permission period) and automatically stops the monitoring operation when the power supply voltage becomes more than the operation voltage. Therefore, the low power consumption mode can be implemented with the memory voltage monitoring circuit without needing troublesome setting by the user.

Furthermore, a semiconductor device according to the present invention comprises a memory voltage monitoring circuit generating a low voltage detection signal when a power supply voltage drops below a memory contents holding voltage, a reset circuit generating a reset signal from an external reset signal, a mode control unit generating a low consumption mode transition signal designating transition to a low consumption mode and then outputting the low consumption mode transition signal to the memory voltage monitoring circuit as an operation no-permission signal, in which the memory voltage monitoring circuit stops its operation while the low consumption mode transmission signal is outputted, and the mode control unit deactivates the low consumption mode transition signal based on the reset signal.

According to this constitution, when the power supply is turned on and the power supply voltage starts to rise, the power supply voltage is lower than the operation voltage of the semiconductor device at first, so that the reset signal of the reset circuit is activated and the mode control unit is initialized. Thus, the operation no-permission signal of the memory voltage monitoring circuit (low consumption mode transition signal) does not work and the memory voltage monitoring circuit starts to monitor the power supply voltage. Since the power supply voltage is lower than the memory contents holding voltage just after the power supply has been turned on, the memory voltage monitoring circuit activates the low voltage detection signal. Then, as the power supply voltage rises and exceeds the operation voltage, the internal circuit such as the CPU or the memory starts to operate. When the internal circuit controls the mode control unit at any time, the mode control unit generates the low consumption mode transition signal and outputs this signal to the memory voltage monitoring circuit as the operation no-permission signal. As a result, the memory voltage monitoring circuit stops the monitoring operation and the power consumption of the semiconductor device is reduced.

The monitoring operation is stopped until the power supply voltage drops below the operation voltage. When the power supply voltage drops below the operation voltage, the reset signal of the reset circuit is activated, and the mode control unit is initialized to cancel the low consumption mode state. Therefore, the memory voltage monitoring circuit restarts to monitor the power supply voltage. When the power supply voltage rises again and the operation no-permission signal is applied from the mode control unit again, the memory voltage monitoring circuit stops the monitoring operation and the power consumption of the semiconductor device is reduced.

In addition, by providing the low voltage detection signal holding circuit holding the low voltage detection signal, even when the monitoring operation of the memory voltage monitoring circuit is stopped before the external reset signal is inputted, since the state of the low voltage detection signal detected by the memory voltage monitoring circuit before stoppage can be held by the low voltage detection signal holding circuit, the reliability of memory contents can be secured.

When the low consumption mode transition signal (operation no-permission signal) is inputted from the mode control unit, the memory voltage monitoring circuit stops the monitoring operation automatically, so that the low power consumption mode can be implemented with the memory voltage monitoring circuit without needing troublesome setting by the user.

As described above, according to the present invention, the memory voltage monitoring circuit operates only while the reset signal is activated as the memory voltage monitoring circuit is lower than the operation voltage and automatically stops the monitoring operation when the power supply voltage becomes more than the operation voltage. In addition, when the low consumption mode transition signal (operation no-permission signal) is inputted from the mode control unit, the memory voltage monitoring circuit stops the monitoring operation automatically. Therefore, the low power consumption mode can be implemented with the memory voltage monitoring circuit without needing troublesome setting by the user. This is particularly effective in a system in which a power supply voltage is instable such as an in-car device or a portable device.

BRIEF DESCRIPTION OF THE DRAWINGS

Other objects of the present invention will be clear by understanding embodiments as will be described below and specified in the appended claims. Implementation of the present invention reminds the person in the art of many advantages which are not described in this specification.

DETAILED DESCRIPTION OF THE INVENTION

Preferred embodiment of the present invention will be described with reference to the drawings hereinafter.

Embodiment 1

Figure 1:
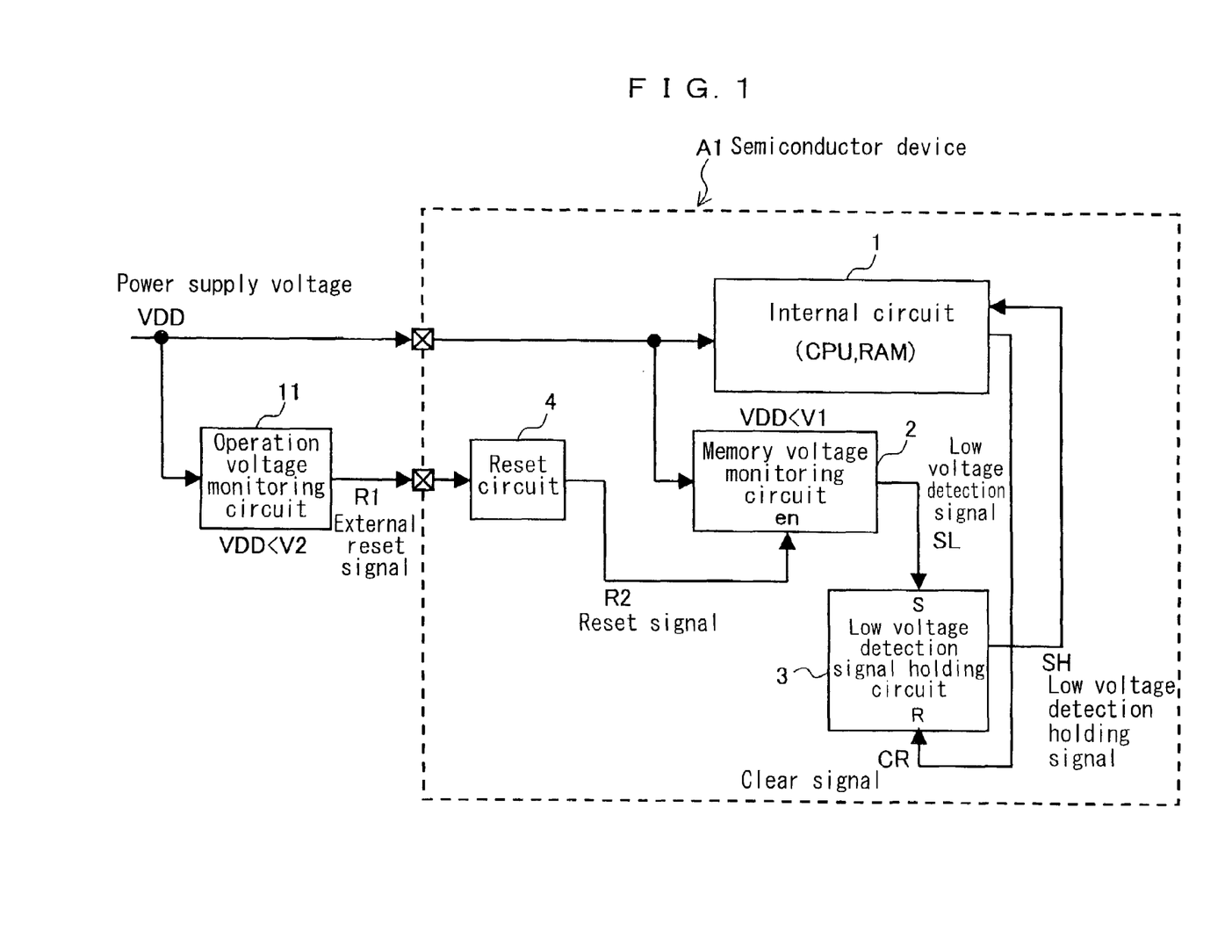
FIG. 1 is a block diagram showing the constitution of a semiconductor device according to an embodiment 1 of the present invention.

FIG. 1 is a block diagram showing the constitution of a semiconductor device according to an embodiment 1 of the present invention. Referring to FIG. 1, reference sign A1 designates a semiconductor device according to the embodiment 1. Reference numeral 1 designates an internal circuit existing in the semiconductor device A1 such as a CPU or a RAM. Reference numeral 2 designates a memory voltage monitoring circuit that monitors a power supply voltage VDD supplied to the semiconductor device A1 to determine whether it drops below a memory contents holding voltage V1 and outputs a low voltage detection signal SL when it drops below the voltage V1. Reference numeral 3 designates a low voltage detection signal holding circuit that temporally holds the low voltage detection signal SL from the memory voltage monitoring circuit 2 and outputs it to the internal circuit 1 as a low voltage detection holding signal SH. Reference numeral 4 designates a reset circuit that receives an external reset signal R1 and generates and outputs a reset signal P2. Reference numeral 11 designates an operation voltage monitoring circuit that is provided outside the semiconductor device A1 and monitors the power supply voltage VDD to determine whether it drops below an operation voltage V2 or not and outputs the external reset signal R1 when it drops below the voltage V2. In addition, although the semiconductor device A1 and the operation voltage monitoring circuit 11 are provided separately in FIG. 1, the operation voltage monitoring circuit 11 may be stored in the semiconductor device A1.

The memory voltage monitoring circuit 2 receives the reset signal R2 from the reset circuit 4 as an operation permission signal and starts an operation. The low voltage detection signal holding circuit 3 is cleared by a clear signal CR from the internal circuit 1.

Figure 2:
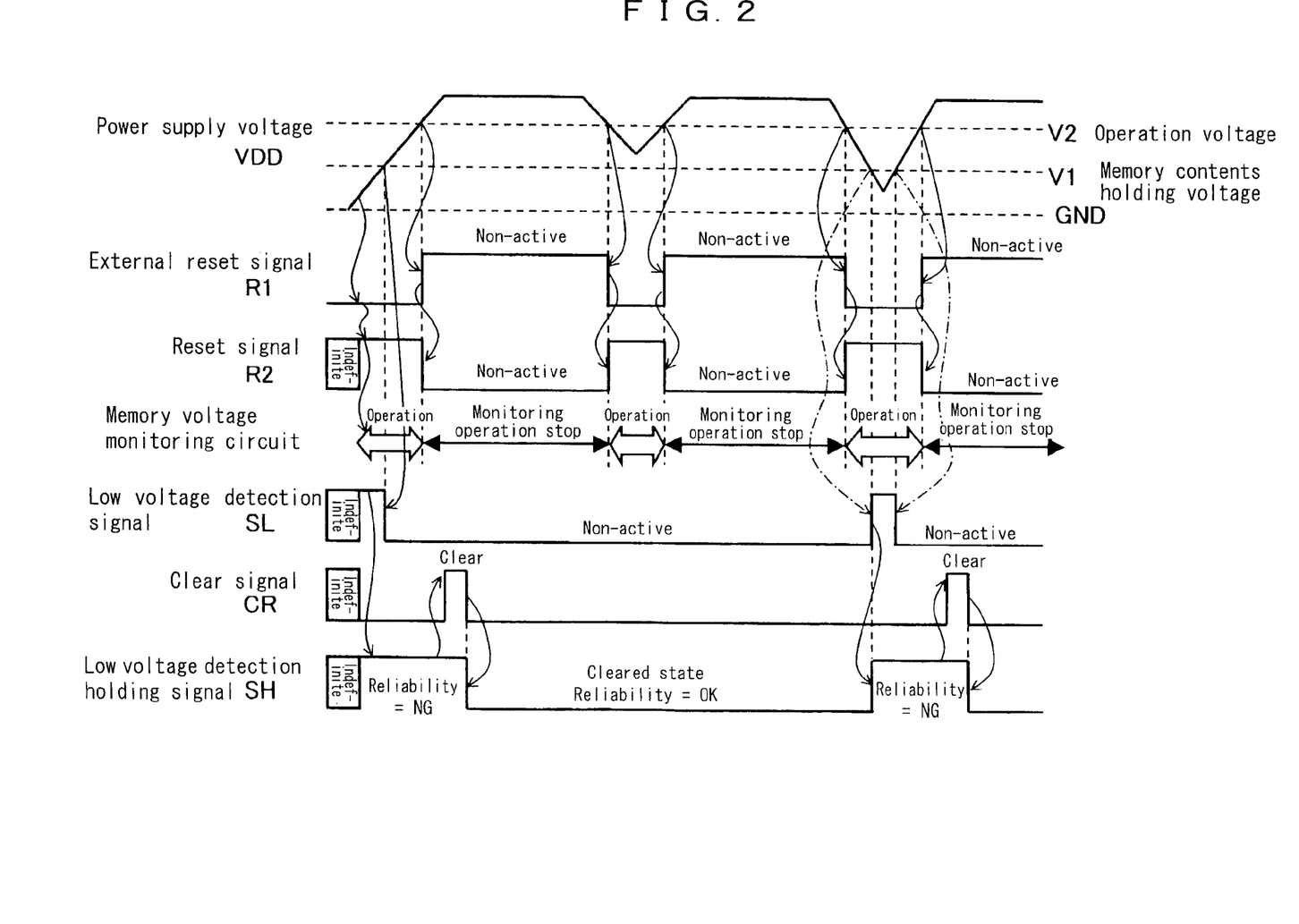
FIG. 2 is a signal waveform diagram showing the operation of the semiconductor device according to the embodiment 1 of the present invention.

Next, the operation of the semiconductor device A1 according to this embodiment will be described with reference to a signal waveform diagram shown in FIG. 2.

(1) An operation at the time of turning on the power supply will be described. After turning on the power supply, the operation voltage monitoring circuit 11 detects a low voltage state (the state in which the power supply voltage VDD is below the operation voltage V2) and activates (=L) the external reset signal R1. Just after the power supply is turned on, although the operation states of the internal circuit 1, the memory voltage monitoring circuit 2, the low voltage detection signal holding circuit 3, and the reset circuit 4 in the semiconductor device A1 are indefinite, when the reset circuit 4 detects that the power supply voltage VDD rises and exceeds the threshold value of the internal semiconductor element, it activates (=H) the reset signal R2. Similarly, when the memory voltage monitoring circuit 2 detects that the power supply voltage VDD exceeds the threshold value of the internal semiconductor element, it starts the monitoring operation. The memory voltage monitoring circuit 2 that started the monitoring operation detects the low voltage state (state in which the power supply voltage VDD is below the memory contents holding voltage V1) and activates (=H) the low voltage detection signal SL. When the low voltage detection signal holding circuit 3 detects that the low voltage detection signal SL is activated (=H), it holds the active information of the low voltage detection signal SL (=H) and outputs a low voltage detection holding signal SH (=H).

Then, when the memory voltage monitoring circuit 2 detects that the power supply voltage VDD rises and becomes the memory contents holding voltage V1 or more, it deactivates (L) the low voltage detection signal SL. However, the low voltage detection holding signal SH (=H) is not changed because of the function of the low voltage detection signal holding circuit 3.

When the operation voltage monitoring circuit 11 detects that the power supply voltage VDD further rises and becomes the operation voltage V2 or more, it deactivates (=H) the external reset signal R1. When the reset circuit 4 detects that the external reset signal R1 is deactivated, it deactivates (=L) the reset signal R2. Similarly, when the memory voltage monitoring circuit 2 detects that the power supply voltage VDD exceeds the operation voltage V2, it stops the monitoring operation. Thus, the power consumption of the semiconductor device A1 is reduced. However, the low voltage detection holding signal SH (=H) is not changed because of the function of the low voltage detection signal holding circuit 3.

Meanwhile, the internal circuit 1 starts the operation when the power supply voltage VDD becomes the operation voltage V2 or more. The internal circuit 1 that started the operation detects that the low voltage detection holding signal SH from the low voltage detection signal holding circuit 3 is "H" and confirms that the reliability of memory contents is damaged. Then, the internal circuit 1 outputs the clear signal CR to clear the low voltage detection holding signal SH.

(2) Next, a description will be made of the operation in which the power supply voltage VDD drops below the operation voltage V2, but it does not become lower than the memory contents holding voltage V1 and returns to the operation voltage V2. In this case, when the operation voltage monitoring circuit 11 detects that the power supply voltage VDD drops below the operation voltage V2, it activates the external reset signal R1 (=L). When the reset circuit 4 detects that the external reset signal R1 is activated (=L) it activates (=H) the reset signal R2. Similarly, when the memory voltage monitoring circuit 2 detects that the power supply voltage VDD drops below the operation voltage V2, it starts the monitoring operation again. However, in this state, since the power supply voltage VDD does not become lower than the memory contents holding voltage V1, the memory voltage monitoring circuit 2 keeps the low voltage detection signal SL deactivated (=L) and the low voltage detection signal holding circuit 3 keeps the low voltage detection holding signal SH cleared (=L).

Thereafter, when the operation voltage monitoring circuit 11 detects that the power supply voltage VDD becomes the operation voltage V2 or more, it deactivates (=H) the external reset signal R1. When the reset circuit 4 detects that the external reset signal R1 is deactivated, it deactivates (=L) the reset signal R2. Similarly, when the memory voltage monitoring circuit 2 detects that the power supply voltage VDD becomes the operation voltage V2 or more, it stops the monitoring operation again. Thus, the power consumption of the semiconductor device A1 is reduced. However, since the memory voltage monitoring circuit 2 keeps the low voltage detection signal SL deactivated (=L) during the operation of the memory voltage monitoring circuit 2, the low voltage detection signal holding circuit 3 keeps the low voltage detection holding signal SH cleared (=L).

When the operation voltage monitoring circuit 11 detects that the power supply voltage VDD becomes the operation voltage V2 or more, it deactivates (=L) the external reset signal R1. When the reset circuit 4 detects that the external reset signal R1 is deactivated, it deactivates (=L) the reset signal R2. Meanwhile, when the power supply voltage VDD becomes the operation voltage V2 or more, the internal circuit 1 starts the operation. The internal circuit 1 that started the operation detects the low voltage detection holding signal SH (=L) and confirms that the reliability of the memory contents is not damaged. Since the internal circuit 1 confirms that that the reliability of the memory contents is maintained, it does not clear the low voltage detection signal holding circuit 3.

(3) A description will be made of the operation when the power supply voltage VDD drops below the operation voltage V2 and drops below the memory contents holding voltage V1 and then returns to the operation voltage V2. In this case, when the operation voltage monitoring circuit 11 detects that the power supply voltage VDD drops below the operation voltage V2, it activates the external reset signal R1 (=L). When the reset circuit 4 detects that the external reset signal R1 is activated (=L), it activates the reset signal R2 (=H) Similarly, when the memory voltage monitoring circuit 2 detects that the power supply voltage VDD drops below the operation voltage V2, it starts the stopped monitoring operation again. However, since the memory voltage monitoring circuit 2 keeps the low voltage detection signal SL deactivated (=L) until the power supply voltage VDD drops below the memory contents holding voltage V1, the low voltage detection signal holding circuit 3 keeps the low voltage detection holding signal SH cleared (=L).

Thereafter, when the memory voltage monitoring circuit 2 detects that the power supply voltage VDD further drops and becomes lower than the memory contents holding voltage V1, it activates (=H) the low voltage detection signal SL. When the low voltage detection signal holding circuit 3 detects that the low voltage detection signal SL (=H) is activated, it holds the active information of the low voltage detection signal SL and outputs the low voltage detection holding signal SH (=H).

When the memory voltage monitoring circuit 2 detects that the power supply voltage VDD becomes higher than the memory contents holding voltage V1, it deactivates (=L) the low voltage detection signal SL, but the low voltage detection holding signal SH (=H) is not changed because of the function of the low voltage detection signal holding circuit 3.

When the operation voltage monitoring circuit 11 detects that the power supply voltage VDD further rises and becomes the operation voltage V2 or more, it deactivates (=H) the external reset signal R1. When the reset circuit 4 detects that the external reset signal R1 is deactivated, it deactivates (=L) the reset signal R2. Similarly, when the memory voltage monitoring circuit 2 detects that the power supply voltage VDD becomes the operation voltage V2 or more, it stops the monitoring operation again. Thus, the power consumption of the semiconductor device A1 is reduced. However, the low voltage detection holding signal SH (=H) is not changed because of the function of the low voltage detection signal holding circuit 3.

When the operation voltage monitoring circuit 11 detects that the power supply voltage VDD becomes the operation voltage V2 or more, it deactivates (=H) the external reset signal R1. When the reset circuit 4 detects that the external reset signal R1 is deactivated, it deactivates (=L) the reset signal R2. The internal circuit 1 detects that the low voltage detection holding signal SH is "H" and confirms that the reliability of the memory contents is damaged. Then the internal circuit 1 outputs the clear signal CR to clear the low voltage detection holding signal SH to the low voltage detection signal holding circuit 3.

As described above, according to this embodiment, since the reset signal R2 outputted from the reset circuit 4 is set to the operation permission signal of the memory voltage monitoring circuit 2, the memory voltage monitoring circuit 2 operates only while the reset signal is activated and the power supply voltage VDD is below the operation voltage V2. Thus, when the power supply voltage VDD becomes the operation voltage V2 or higher, the monitoring operation is automatically stopped. Thus, the low power consumption mode can be implemented using the memory voltage monitoring circuit 2 without needing troublesome settings by a user.

Figure 3:
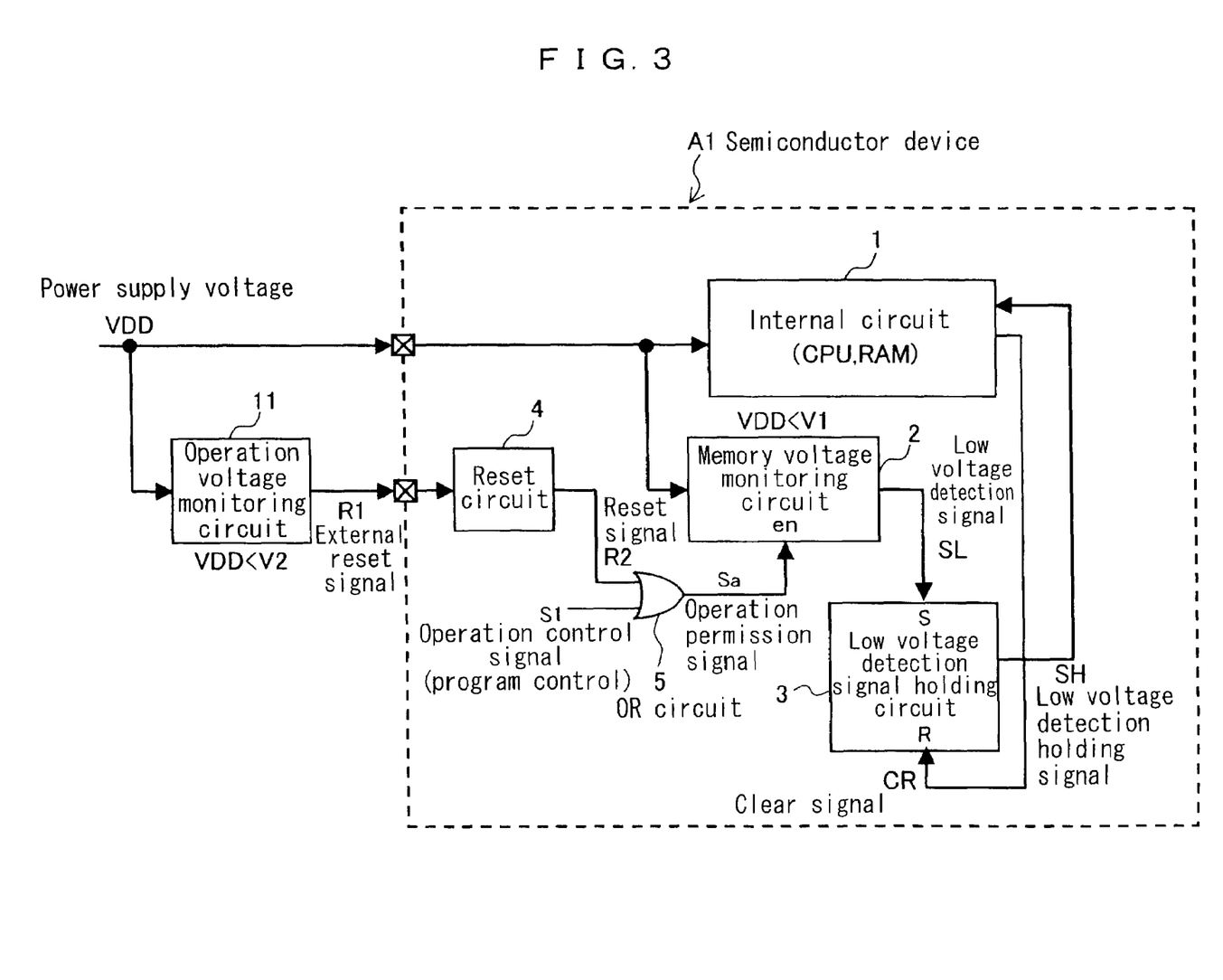
FIG. 3 is a block diagram (1) showing the constitution of a semiconductor device according to a variation of the embodiment 1 of the present invention.

In addition, as shown in FIG. 3, an OR circuit 5 may be provided. In this case, an operation control signal S1 is generated by a program to control the operation of the memory voltage monitoring circuit 2 and then an OR signal between the reset signal R2 from the reset circuit 4 and the operation control signal S1 is formed by the OR circuit 5. Then, the OR signal is supplied to the memory voltage monitoring circuit 2 as an operation permission signal Sa. In this case also, there can be provided the same effect as that in the constitution of the embodiment 1.

Figure 4:
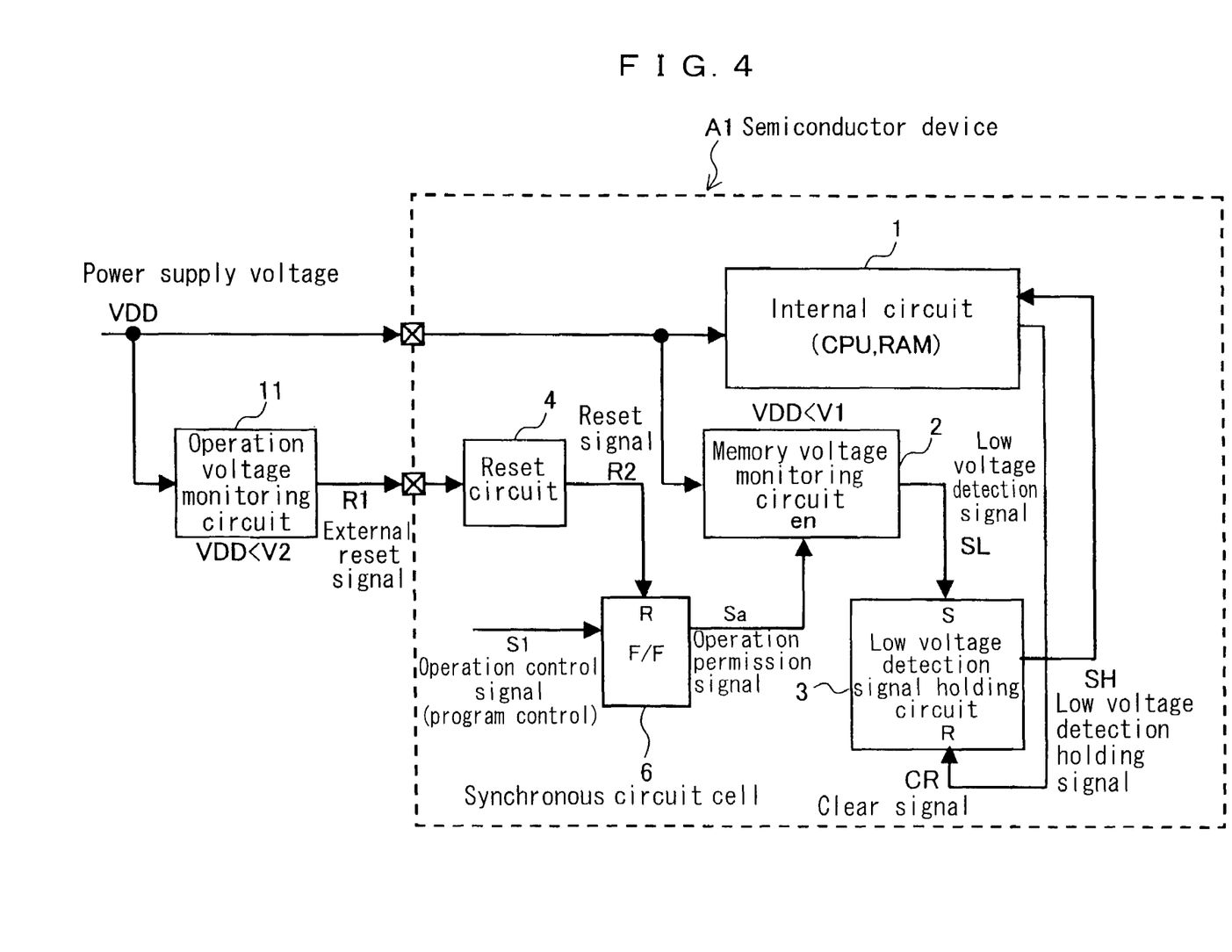
FIG. 4 is a block diagram (2) showing the constitution of a semiconductor device according to a variation of the embodiment 1 of the present invention.

In addition, a synchronous circuit cell (flip-flop) 6 may be provided as shown in FIG. 4. In this case, an operation control signal S1 is generated by a program to control the operation of the memory voltage monitoring circuit 2 and then the operation control signal S1 is initialized by the reset signal R2 in the synchronous circuit cell 6 and activated. Then, this activated operation control signal S1 is supplied to the memory voltage monitoring circuit 2 as an operation permission signal Sa. In this case also, there can be provided the same effect as that in the constitution of the embodiment 1.

Embodiment 2

Figure 5:
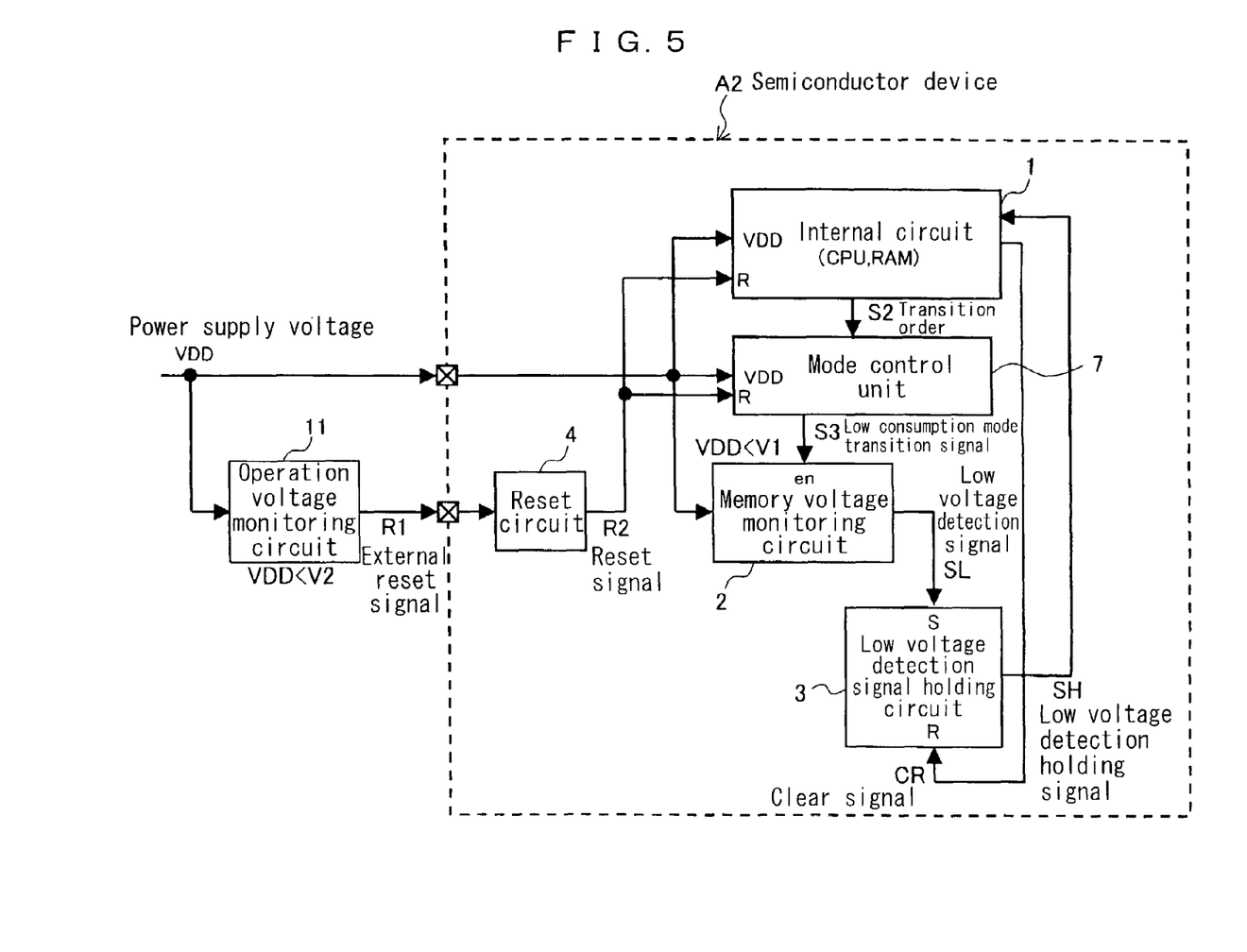
FIG. 5 is a block diagram showing the constitution of a semiconductor device according to an embodiment 2 of the present invention.

FIG. 5 is a block diagram showing the constitution of a semiconductor device according to an embodiment 2 of the present invention. In FIG. 5, the same reference signs as in FIG. 1 in the embodiment 1 designate the same component and their detailed description will be omitted. Referring to FIG. 5, reference sign A2 designates the semiconductor device according to the embodiment 2. Reference numeral 7 designates a mode control unit that generates a low consumption mode transition signal S3 by a transition order S2 to a low consumption mode from an internal circuit 1 and then outputs the generated low consumption mode transition signal S3 to a memory voltage monitoring circuit 2 as an operation no-permission signal. A reset signal R2 is inputted from a reset circuit 4 to the internal circuit 1 and the mode control unit 7, and when the reset signal R2 is activated, the internal circuit 1 and the mode control unit 7 are initialized. When an inputted power supply voltage VDD is lower than a memory contents holding voltage V1, the memory voltage monitoring circuit 2 generates a low voltage detection signal SL. The memory voltage monitoring circuit 2 receives the low consumption mode transition signal S3 from the mode control unit 7 as the operation no-permission signal and stops a monitoring operation.

Figure 6:
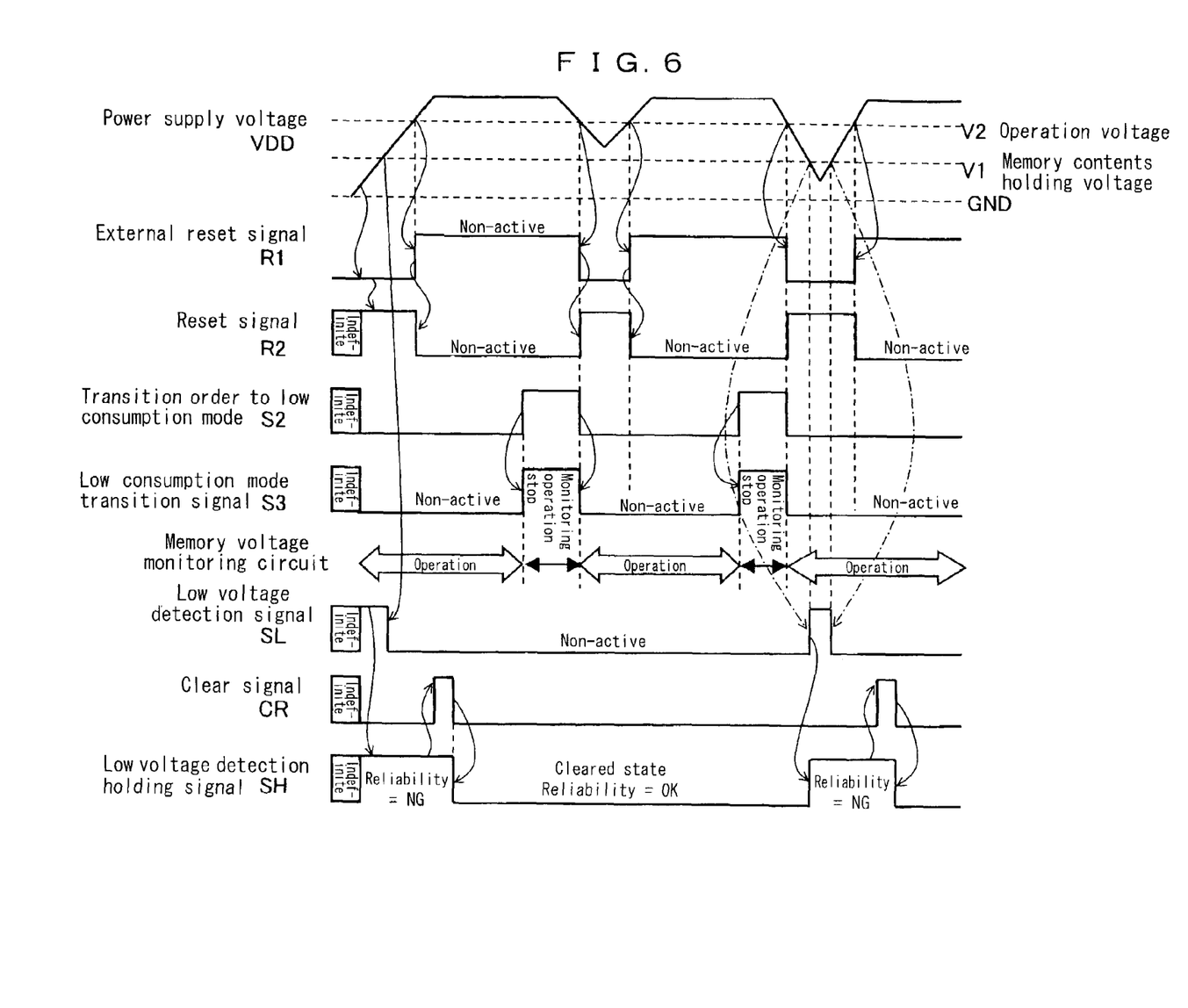
FIG. 6 is a signal waveform diagram showing the operation of the semiconductor device according to the embodiment 2 of the present invention.

Next, the operation of the semiconductor device A2 according to this embodiment will be described with reference to a signal waveform diagram shown in FIG. 6.

(1) An operation at the time of turning on the power supply will be described. After the power supply is turned on, when an operation voltage monitoring circuit 11 detects a low voltage state (the state in which the power supply voltage VDD is below the operation voltage V2), it activates (=L) an external reset signal R1. Just after the power supply is turned on, although the operation states of the internal circuit 1, the memory voltage monitoring circuit 2, the low voltage detection signal holding circuit 3, the reset circuit 4, and the mode control unit 7 in the semiconductor device A2 are indefinite, when the reset circuit 4 detects that the power supply voltage VDD rises and exceeds the threshold value of an internal semiconductor element, it activates (=H) the reset signal R2. When the mode control unit 7 detects that the reset signal R2 is activated (=H), it is initialized and deactivates the low consumption mode transition signal S3 (=L).

When the memory voltage monitoring circuit 2 detects that the low consumption mode transition signal S3 is deactivated (=L), it starts the monitoring operation. When the memory voltage monitoring circuit 2 that started the monitoring operation detects the low voltage state (state in which the power supply voltage VDD is below the memory contents holding voltage V1), it activates (=H) the low voltage detection signal SL. When the low voltage detection signal holding circuit 3 detects that the low voltage detection signal SL is activated (=H), it holds the active information of the low voltage detection signal SL =H and outputs a low voltage detection holding signal SH (=H).

Then, when the power supply voltage VDD rises and becomes the memory contents holding voltage V1 or more, the low voltage detection signal SL of the memory voltage monitoring circuit 2 is deactivated. However, the low voltage detection holding signal SH (=H) is not changed because of the function of the low voltage detection signal holding circuit 3.

Thereafter, when the operation voltage monitoring circuit 11 detects that the power supply voltage VDD further rises and becomes the operation voltage V2 or more, it deactivates (=H) the external reset signal R1. When the reset circuit 4 detects that the external reset signal R1 is deactivated, it deactivates (=L) the reset signal R2. Meanwhile, the internal circuit 1 starts the operation because the power supply voltage VDD becomes the operation voltage V2 or more. Then, the internal circuit 1 monitors whether the low voltage detection signal holding circuit 3 holds the low voltage detection holding signal SH or not. When it is detected that the low voltage detection signal holding circuit 3 holds the low voltage detection holding signal SH (=H), the internal circuit 1 confirms that the reliability of the memory contents is damaged from that detection. The internal circuit 1 that confirmed the above outputs the clear signal CR to clear the low voltage detection holding signal SH.

After a time required for monitoring whether the low voltage detection signal holding circuit 3 holds the low voltage detection signal or not has passed, the internal circuit 1 outputs the transition order S2 to transit to the low consumption mode. When the mode control unit 7 detects that the transition order S2 is outputted from the internal circuit 1, it activates (=H) the low consumption mode transition signal S3. When the memory voltage monitoring circuit 2 detects that the low consumption mode transition signal S3 is activated, it stops the monitoring operation. Thus, the power consumption of the semiconductor device A2 can be reduced.

(2) Next, a description will be made of the operation when the power supply voltage VDD drops below the operation voltage V2, but it does not become lower than the memory contents holding voltage V1 and returns to the operation voltage V2 during the low consumption mode. In this case, when the operation voltage monitoring circuit 11 detects that the power supply voltage VDD is below the operation voltage V2, it activates the external reset signal R1 (=L). When the reset circuit 4 detects that the external reset signal R1 is activated (=L), it activates (=H) the reset signal R2. When the mode control unit 7 detects that the reset signal R2 is activated, it deactivates (=L) the low consumption mode transition signal S3. When the memory voltage monitoring circuit 2 detects that the low consumption mode transition signal is deactivated (=L), it starts the monitoring operation. However, since the power supply voltage VDD does not become lower than the memory contents holding voltage V1, the low voltage detection signal SL is kept deactivated (=L) and the low voltage detection holding signal SH is kept cleared (=L).

Thereafter, when the operation voltage monitoring circuit 11 detects that the power supply voltage VDD is restored and becomes the operation voltage V2 or more, it deactivates (=H) the external reset signal R1. When the reset circuit 4 detects that the external reset signal R1 is deactivated, it deactivates the reset signal R2 (=L). When the power supply voltage VDD becomes the operation voltage V2 or more, the internal circuit 1 starts the operation. When the internal circuit 1 that started the operation detects the low voltage detection holding signal SH (=L), it confirms that the reliability of the memory contents is not damaged.

(3) A description will be made of the operation when the power supply voltage VDD drops below the operation voltage V2 and drops below the memory contents holding voltage V1 and then returns to the operation voltage V2 during the low consumption mode. In this case, when the operation voltage monitoring circuit 11 detects that the power supply voltage VDD drops below the operation voltage V2, it activates the external reset signal R1 (=L). When the reset circuit 4 detects that the external reset signal R1 is activated (=L) it activates the reset signal R2 (=H). When the mode control unit 7 detects that the reset signal R2 is activated, it is initialized and deactivates (=L) the low consumption mode transition signal S3. When the memory voltage monitoring circuit 2 detects that the low consumption mode transition signal S3 is deactivated, it starts the monitoring operation. However, since the power supply voltage VDD does not drop below the memory contents holding voltage V1, the low voltage detection signal SL is kept deactivated (=L) and the low voltage detection holding signal SH is kept cleared (=L).

Thereafter, when the memory voltage monitoring circuit 2 detects that the power supply voltage VDD further drops and becomes lower than the memory contents holding voltage V1, it activates (=H) the low voltage detection signal SL. When the low voltage detection signal holding circuit 3 detects that the low voltage detection signal SL is activated, it holds the active information of the low voltage detection signal SL and outputs the low voltage detection holding signal SH (=H).

When the memory voltage monitoring circuit 2 detects that the power supply voltage VDD becomes higher than the memory contents holding voltage V1, it deactivates the low voltage detection signal SL (=L), but the low voltage detection holding signal SH is not changed (=H) because of the function of the low voltage detection signal holding circuit 3.

When the operation voltage monitoring circuit 11 detects that the power supply voltage VDD further rises and becomes the operation voltage V2 or more, it deactivates the external reset signal R1 (=H). When the reset circuit 4 detects that the external reset signal R1 is deactivated, it deactivates (=L) the reset signal R2. Meanwhile, when the power supply voltage VDD becomes the operation voltage V2 or more, the internal circuit 1 starts the operation. When the internal circuit 1 detects that the low voltage detection holding signal SH is "H", it confirms that the reliability of the memory contents is damaged. Thus, the internal circuit 1 outputs the clear signal CR to clear the low voltage detection holding signal SH.

As described above, according to this embodiment, since the low consumption mode transition signal S3 is generated and the mode control unit 7 that initializes the low consumption mode transition signal S3 with the reset signal R2 outputted from the reset circuit 4 is provided, when the operation no-permission signal S3 is inputted from the mode control unit 7, the memory voltage monitoring circuit 2 automatically stops the monitoring operation. Thus, the low power consumption mode can be implemented using the memory voltage monitoring circuit 2 without needing troublesome settings by a user.

Although the embodiments of the present invention have been described in the above, various combinations and arrangements of the components in the preferred embodiment can be made without departing from the spirit and scope of the present invention as will be claimed below.

What is claimed is:

1. A semiconductor device comprising:
    a memory voltage monitoring circuit generating a low voltage detection signal when a power supply voltage drops below a memory contents holding voltage; and
    a reset circuit generating a reset signal from an external reset signal, the external reset signal being generated by an operation voltage monitoring circuit when the power supply voltage drops below an operation voltage of the semiconductor device, and outputting the reset signal to the memory voltage monitoring circuit as an operation permission/no-permission signal, wherein
    the memory voltage monitoring circuit operates while the reset signal shows operation permission.

2. The semiconductor device according to claim 1, further comprising a low voltage detection signal holding circuit holding the low voltage detection signal.

3. The semiconductor device according to claim 2, wherein
    the reset circuit generates the reset signal showing the operation permission while the external reset signal shows that the power supply voltage is below the operation voltage.

4. The semiconductor device according to claim 3, further comprising an internal circuit that monitors whether the low voltage detection signal holding circuit holds the low voltage detection signal or not while the reset signal shows the operation permission, wherein
    the internal circuit outputs a clear signal when it detects that the low voltage detection signal holding circuit holds the low voltage detection signal, and
    the low voltage detection signal holding circuit stops holding the low voltage detection signal when it detects the clear signal.

5. The semiconductor device according to 3, wherein
    the operation voltage and the memory contents holding voltage have a relation such that the operation voltage > the memory contents holding voltage.

6. The semiconductor device according to claim 1, wherein
    the low voltage detection signal is a signal showing that the data stored in the semiconductor device is defective in reliability.

7. The semiconductor device according to claim 1, further comprising an OR circuit, wherein
    the reset circuit outputs the reset signal to the OR circuit instead of outputting it to the memory voltage monitoring circuit, and
    the OR circuit generates an OR signal between an operation control signal set by a program and the reset signal and outputs the OR signal to the memory voltage monitoring circuit as the operation permission/no-permission signal.

8. The semiconductor device according to claim 1, further comprising a synchronous circuit cell, wherein
    the reset circuit outputs the reset signal to the synchronous circuit cell instead of outputting it to the memory voltage monitoring circuit, and
    the synchronous circuit cell controls an operation control signal set by a program based on the reset signal and outputs it to the memory voltage monitoring circuit as the operation permission/no-permission signal.

* * * * *